(12) United States Patent
Wang et al.

(10) Patent No.: US 8,801,192 B2
(45) Date of Patent: Aug. 12, 2014

(54) LIGHT SOURCE MODULE AND PROJECTOR USING THE SAME

(75) Inventors: Hsiu-Tsu Wang, Taipei (TW); Yung-Yu Chiang, Taipei (TW)

(73) Assignee: BenQ Corporation, Taipei (TW)

( * ) Notice: Subject to any disclaimer, the term of this patent is extended or adjusted under 35 U.S.C. 154(b) by 58 days.

(21) Appl. No.: 13/550,606

(22) Filed: Jul. 17, 2012

(65) Prior Publication Data

US 2013/0088690 A1 Apr. 11, 2013

(30) Foreign Application Priority Data

Oct. 7, 2011 (TW) .............................. 100218928 U

(51) Int. Cl.
*G03B 21/14* (2006.01)

(52) U.S. Cl.
USPC ................... 353/84; 353/30; 353/31; 353/38; 353/85; 353/122; 348/743; 348/744

(58) Field of Classification Search
USPC .............. 353/30, 31, 33, 38, 81, 84, 85, 122; 345/39, 46, 82, 83; 348/742–747, 804, 348/E5.133, E5.141, E5.142, E9.012, 348/E9.027; 349/5, 7–9
See application file for complete search history.

(56) References Cited

U.S. PATENT DOCUMENTS

| | | | |
|---|---|---|---|
| 7,070,300 B2 | 7/2006 | Harbers et al. | |
| 7,278,743 B2 * | 10/2007 | Park | 353/20 |
| 7,651,243 B2 | 1/2010 | McGuire, Jr. et al. | |
| 8,425,042 B2 * | 4/2013 | Hruska et al. | 353/7 |
| 2004/0008324 A1 * | 1/2004 | Dho | 353/31 |
| 2005/0151936 A1 * | 7/2005 | Nonaka | 353/84 |
| 2005/0206855 A1 * | 9/2005 | Hori | 353/84 |
| 2007/0064161 A1 * | 3/2007 | Takeda | 348/743 |
| 2010/0079730 A1 | 4/2010 | Shibasaki | |
| 2010/0302464 A1 | 12/2010 | Raring et al. | |
| 2013/0070205 A1 * | 3/2013 | Pan et al. | 353/31 |

* cited by examiner

*Primary Examiner* — Sultan Chowdhury

(57) ABSTRACT

A light source module and a projector using the same are provided. The light source module includes a monochromatic light source emitting a monochromatic light, a rotating wheel having a light transmitting area and a wavelength transforming area, a filter wheel rotating at a same rotation speed with the rotating wheel, and a dichroic mirror disposed between the rotating wheel and the filter wheel. The wavelength transforming area is coated with a first wavelength transforming material capable of transforming the first color light into a second color light. The filter wheel has a first color filter area and a second color filter area respectively corresponding to the light transmitting area and the wavelength transforming area. The dichroic mirror reflects the first color light to the rotating wheel and allows the second color light to transmit therethrough.

24 Claims, 8 Drawing Sheets

LIGHT SOURCE MODULE AND PROJECTOR USING THE SAME

BACKGROUND OF THE INVENTION

1. Field of the Invention

This invention generally relates to a light source module and a projector using the same. More particularly, this invention relates to a light source module using a monochromatic light source and a projector using the same.

2. Description of the Prior Art

In present, displays for displaying images can be roughly sorted to the projecting type display, such as projector, and the direct-view type display, such as CRT display, plasma display, liquid crystal display, etc. Considering the limitation of manufacturing technique and the cost of large size panel, it usually adopts the projecting type display for displaying large size images.

A projector can use halogen lamps or LEDs as the light source. The halogen lamp generally has a shorter lifetime of about 1000 hours and transforms merely 2-3% of energy into light, wherein the rest of energy is transformed into heat. Contrast to the halogen lamp, LED is widely used as the light source of a projector due to its higher energy utilization rate. Conventional projector LED light sources generally include a red LED light source, a green LED light source, and a blue LED light source. Each light source includes a plurality of LEDs to form a light source array to increase the brightness of the images projected by the projector. As a result, three light source arrays are formed and therefore it is hard to decrease the volume of the projector. The conventional light source and the projector using the same are still improvable.

SUMMARY OF THE INVENTION

It is an object of the present invention to provide a light source module and a projector using the same, wherein the number of light sources of different color can be reduced.

The light source module includes a monochromatic light source, a rotating wheel, a filter wheel, and a dichroic mirror. The monochromatic light source emits a first color light. The rotating wheel is capable of rotating about an axis. The rotating wheel has a light transmitting area and a wavelength transforming area, wherein the wavelength transforming area is coated with a first wavelength transforming material capable of transforming the first color light into a second color light. The filter wheel rotates about the same axis at the same rotation speed with the rotating wheel. The filter wheel has a first color filter area and a second color filter area respectively corresponding to the light transmitting area and the wavelength transforming area. The dichroic mirror is disposed between the rotating wheel and the filter wheel. The dichroic mirror reflects the first color light to the rotating wheel and allows the second color light to transmit therethrough. When the first color light is incident onto the light transmitting area, the first color light transmits through the rotating wheel, passes along a first light path, and transmits through the first color filter area. When the first color light is incident onto the wavelength transforming area, the first color light is transformed into a second color light that passes along a second light path and transmits through the second color filter area.

The light source module further includes a reflecting mirror module having a plurality of reflecting mirrors. When the first color light transmits through the rotating wheel, the first color light is reflected to one surface of the dichroic mirror by the reflecting mirror module and then reflected by the other surface of the dichroic mirror to transmit through the first color filter area. The second color light passes along the second light path to transmit through the dichroic mirror and then transmits through the second color filter area, wherein the part of the first light path after the first color light is incident onto the other surface of the dichroic mirror overlaps the part of the second light path after the second color light has transmitted through the dichroic mirror.

The wavelength transforming area further includes a second wavelength transforming material for transforming the first color light into a third color light. The filter wheel further includes a third color filter area corresponding to the second wavelength transforming area of the third color light. Both the second color light and the third color light pass along the second light path, and then second color light transmits through the second color filter area and the third color light transmits through the third color filter area respectively. The first color light is a blue ray. The second color light is a green ray. The third color light is a red ray. The first color filter area of the filter wheel permits the blue ray to transmit therethrough. The second color filter area of the filter wheel permits the green ray to transmit therethrough. The third color filter area of the filter wheel permits the red ray to transmit therethrough.

The rotating wheel and the filter wheel are pivotally connected with a shaft, wherein one of the rotating wheel, the shaft, and the filter wheel is connected with a rotating motor. The first light path and the shaft are located at different planes. The diameter size of the shaft is in direct proportion to the rotation speed of the rotating motor. The rotating wheel and the filter wheel are respectively connected with a first rotating motor and a second rotating motor, wherein the first rotating motor and the second rotating motor rotate at same rotation speed. The part of the first light path detours the rotating wheel after the first color light has transmitted through the rotating wheel.

The light source module further includes a plurality of monochromatic light sources and a lens. The plurality of monochromatic light sources is disposed in an array or in a line for emitting a plurality of first color lights advancing along the same direction. The lens condenses the plurality of first color lights to form a light beam being guided to the dichroic mirror. The light transmitting area of the rotating wheel is an opening for the first color light to transmit therethrough, wherein the wavelength transforming area is a reflective surface coated with the first wavelength transforming material. The first color filter area of the filter wheel is an opening for the first color light to transmit therethrough, wherein the second color filter area is a transparent filter material.

The projector includes the above mentioned light source module and an imaging device. The imaging device is disposed on the other side of the filter wheel with respect to the rotating wheel for generating images by using light from the light source module.

The light source can exclude the dichroic mirror. When the first color light is incident onto the light transmitting area, the first color light transmits through the rotating wheel and the first color filter area. When the first color light is incident onto the wavelength transforming area, the first color light is transformed into a second color light that transmits through the second color filter area. The light transmitting area of the rotating wheel is an opening for the first color light to transmit therethrough, wherein the wavelength transforming area is a transparent plate coated with the first wavelength transforming material.

DETAILED DESCRIPTION OF THE PREFERRED EMBODIMENT

Figure 1A:
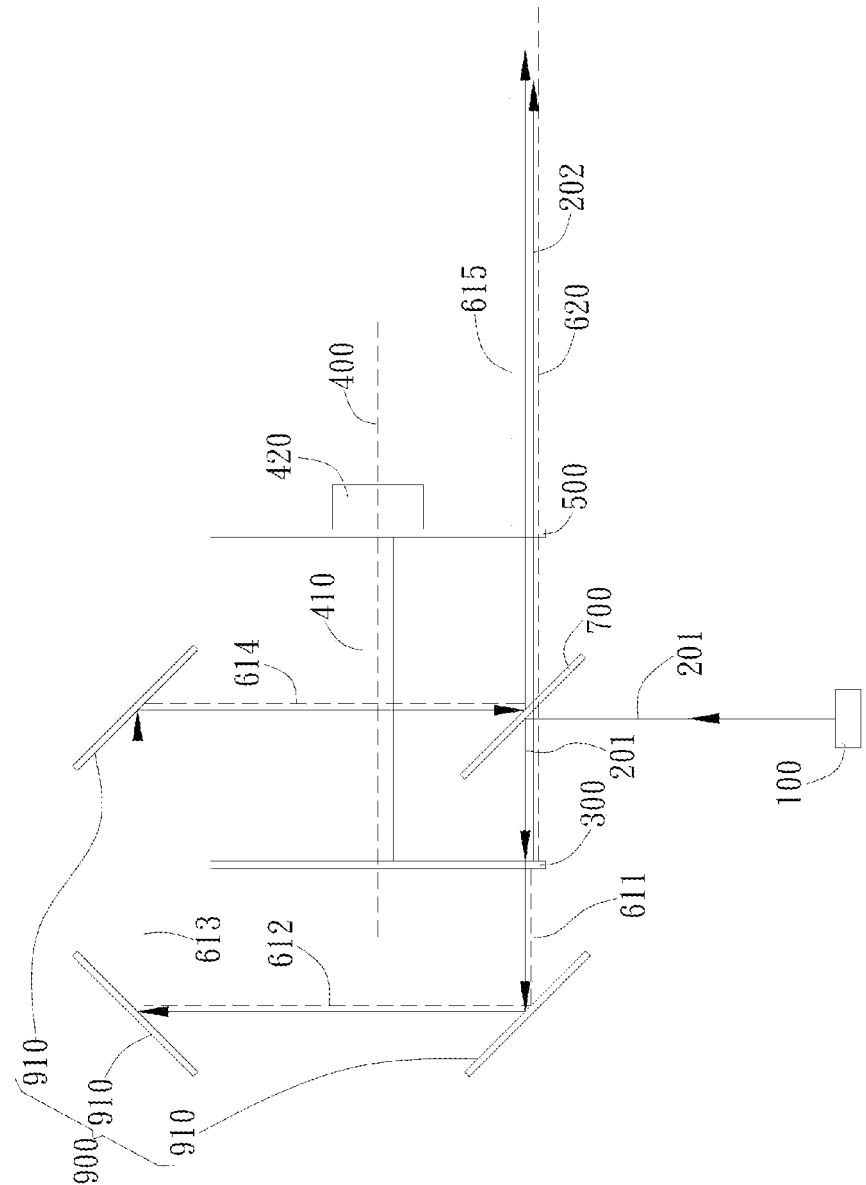
FIG. 1A is top view of one embodiment of the present invention.
Figure 1B:
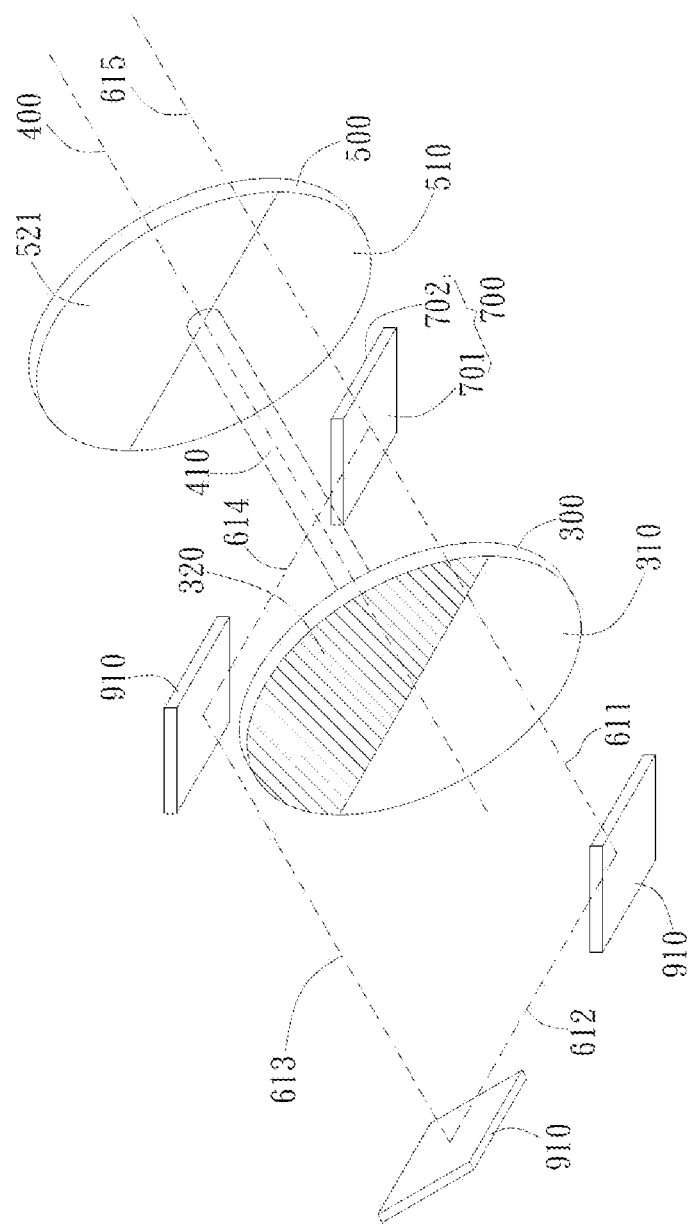
FIG. 1B is schematic view of one embodiment of the present invention.

As the embodiment shown in FIG. 1A, the light source module 800 of the present invention includes a monochromatic light source 100, a rotating wheel 300, a filter wheel 500, and a dichroic mirror 700. The monochromatic light source 100 emits a first color light 201. The rotating wheel 300 can rotate about an axis 400. As shown in FIG. 1B, the rotating wheel 300 has a light transmitting area 310 and a wavelength transforming area 320, wherein the wavelength transforming area 320 is coated with a first wavelength transforming material. The first wavelength transforming material is capable of transforming the first color light into a second color light. The filter wheel 500 rotates about the same axis 400 and rotates at the same rotation speed with the rotating wheel 300. The filter wheel 500 has a first color filter area 510 and a second color filter area 521 respectively corresponding to the light transmitting area 310 and the wavelength transforming area 320. More particularly, the light transmitting area 310 of the rotating wheel 300 is preferably an opening for the first color light to transmit therethrough. In different embodiments, however, the light transmitting area 310 of the rotating wheel 300 is a transparent plate such as, but not limited to, a plate made by transparent material. The wavelength transforming area 320 is preferably a reflective surface coated with the first wavelength transforming material. The first color filter area 510 of the filter wheel 500 is preferably an opening for the first color light to transmit therethrough. In different embodiments, however, the first color filter area 510 of the filter wheel 500 is a transparent plate allowing the first color light to transmit therethrough. For example, the first color filter area 510 of the filter wheel 500 can be, but not limited to, a plate made by transparent material. The second color filter area 521 is preferably a transparent filter material such as, but not limited to, Polymethylmethacrylate.

As the preferred embodiment shown in FIG. 1A, the dichroic mirror 700 is disposed between the rotating wheel 300 and the filter wheel 500. The dichroic mirror 700 reflects the first color light to the rotating wheel 300 and allows the second color light to pass therethrough. When the first color light 201 shown in FIG. 1A is incident onto the light transmitting area 310 (shown in FIG. 1B), the first color light 201 transmits through the light transmitting area 310 of the rotating wheel 300, passes along a first light path, and then transmits through the first color filter area 510 of the filter wheel 500 (shown in FIG. 1B). The first light path preferably includes, but not limited to, the path 611, the path 612, the path 613, the path 614, and the path 615 shown in FIG. 1A. When the first color light 201 is incident onto the wavelength transforming area 320 (shown in FIG. 1B), the first color light 201 is transformed into a second color light 202, which passes along a second light path and transmits through the second color filter area 521 (shown in FIG. 1B). The second light path is preferably, but not limited to, the path 620 shown in FIG. 1A.

Figure 1C:
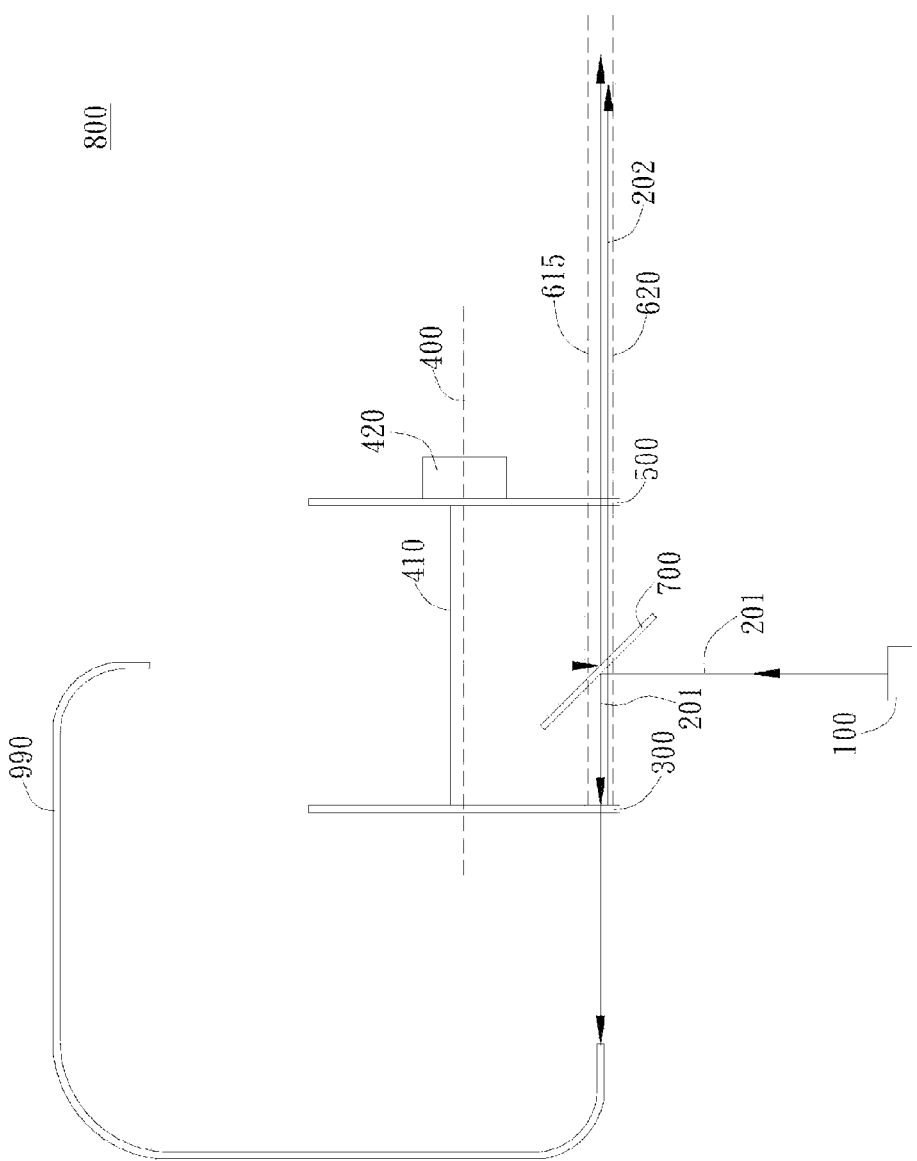
FIG. 1C is top view of one embodiment of the present invention using the optical fiber.

More particularly, as the preferred embodiment shown in FIG. 1A, the light source module 800 further includes a reflecting mirror module 900 having a plurality of reflecting mirrors 910. When the first color light 201 transmits through the rotating wheel 300, the first color light 201 is reflected to one surface 701 of the dichroic mirror 700 by the reflecting mirror module 900 and then reflected by the other surface 702 of the dichroic mirror 700 to transmit through the first color filter area 510 of the filter wheel 500. In the preferred embodiment, the paths of the first color light 201 transmitting through the rotating wheel 300 and reflected to one surface 701 of the dichroic mirror 700 are respectively the path 611, the path 612, the path 613, and the path 614. The path of the first color light 201 reflected by the other surface 702 of the dichroic mirror 700 to transmit through the first color filter area 510 of the filter wheel 500 is the path 615, wherein both surfaces 701 and 702 of the dichroic mirror 700 are capable of reflecting the first color light 201. The part of the first light path detours the rotating wheel 300 after the first color light 201 has transmitted through the rotating wheel 300. The second light path of the second color light 202 transmits through the dichroic mirror 700 first and then transmits through the second color filter area 521 of the filter wheel 500 (shown in FIG. 1B). The part of the first light path after the first color light 201 is incident on the dichroic mirror 700 (i.e. reflected to the other surface 702 of the dichroic mirror 700) overlaps the part of the second light path after the second color light 202 is transmitting through the dichroic mirror 700 (i.e. the path 615 overlaps the path 620 shown in FIG. 1A). In other words, one function of the reflecting mirror module 900 is to reflect the first color light 201 that has transmitted through the rotating wheel 300 to bypass the rotating wheel 300. Therefore, in a different embodiment shown in FIG. 1C, the reflecting mirror module 900 can be replaced by an optical fiber 900 or other devices or means having the same function.

As a result, the light source module 800 of the present invention is capable of transforming the first color light emitted by the monochromatic light source into the second color light for simultaneously outputting the first color light and the second color light. In other words, it is capable to simultaneously output more than two colors of light by using only one monochromatic light source. Therefore, the use of different color light sources can be reduced. On the other hand, the light source module of the present can constitute a projector with an imaging device. The imaging device is disposed on the other side of the filter wheel with respect to the rotating wheel for generating images by using light from the light source module. Since the use of different color light sources can be reduced in the light source module of the present invention, the space for disposing the light source in the projector can be saved to reduce the volume of the projector.

In a preferred embodiment, the wavelength transforming area 320 of the light source module 800 further includes a second wavelength transforming material for transforming the first color light into a third color light. More particularly, the wavelength transforming area 320 can include a first wavelength transforming area 321 and a second wavelength transforming area 322. The first wavelength transforming area 321 has the first wavelength transforming material for transforming the first color light into the second color light. The second wavelength transforming area 322 has the second wavelength transforming material for transforming the first color light into the third color light. The filter wheel 500 further includes a third color filter area 522 corresponding to the second wavelength transforming area 322 of the third color light. As the preferred embodiment shown in FIG. 2B, both the second color light 202 and the third color light 203 pass along the second light path, i.e. the path 620, and the second color light 202 transmits through the second color filter area 521 and the third color light 203 transmits the third color filter area 522 respectively. The first color light is a blue ray. The second color light is a green ray. The third color light is a red ray. The first color filter area 510 of the filter wheel 500 permits the blue ray to transmit therethrough. The second color filter area 521 of the filter wheel 500 permits the green ray to transmit therethrough. The third color filter area 522 of the filter wheel permits the red ray to transmit therethrough. However, the ray color of the first, second and third color light can be chosen or interchanged by user.

Figure 2A:
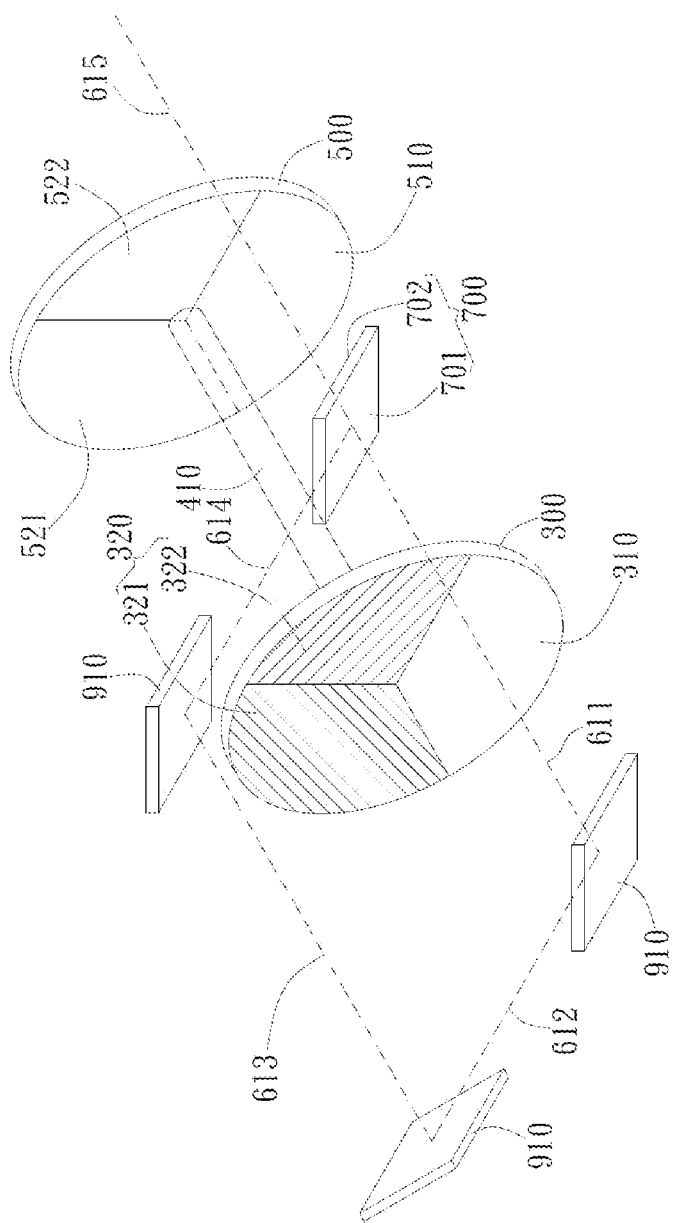
FIG. 2A is schematic view of a preferred embodiment of the present invention.
Figure 2B:
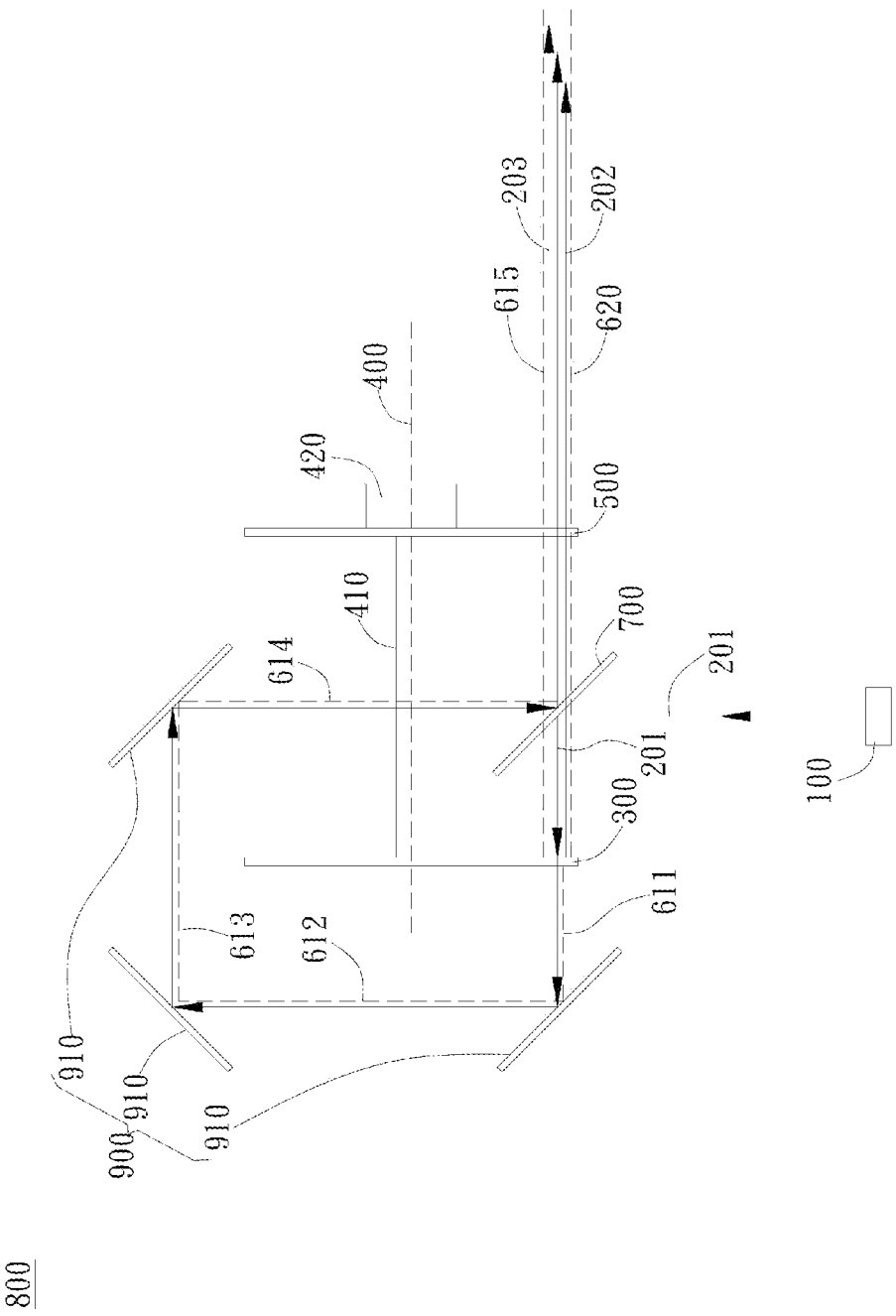
FIG. 2B is top view of a preferred embodiment of the present invention.

The filter wheel 500 rotates about the same axis 400 and rotates at the same rotation speed with the rotating wheel 300. This ensures that the light transmitting area corresponds to the first color filter area and each wavelength transforming area respectively corresponds to other color filter areas. Take the embodiment shown in FIG. 2A as an example, it is to ensure that the light transmitting area 310, the first wavelength transforming area 321, and the second wavelength transforming area 322 of the rotating wheel 300 respectively correspond to the first color filter area 510, the second color filter area 521, and the third color filter area 522 of the filter wheel 500. There are many means to make the filter wheel 500 rotate about the same axis 400 at the same rotation speed with the rotating wheel 300. As the preferred embodiment shown in FIG. 1B, the rotating wheel 300 and the filter wheel 500 are pivotally connected with a shaft 410, wherein one of the rotating wheel 300, the shaft 410, and the filter wheel 500 is connected with a rotating motor 420 (e.g. it is the filter wheel 500 connected with the rotating motor 420 in this embodiment). The diameter size of the shaft 410 is preferably in direct proportion to the rotation speed of the rotating motor 420 for providing sufficient structure strength with the shaft 410 having proper diameter size. In addition to making sure the structure of the rotating wheel 300, the shaft 410, and the filter wheel 500 is stable, the improper increasing in weight, volume, and cost is also avoidable. As shown in FIG. 2A, the first light path (i.e. the collection of paths 611, 612, 613, 614, and 615) and the shaft 410 are located at different planes to prevent the shaft 410 from blocking the light to advance along the first light path.

Figure 3:
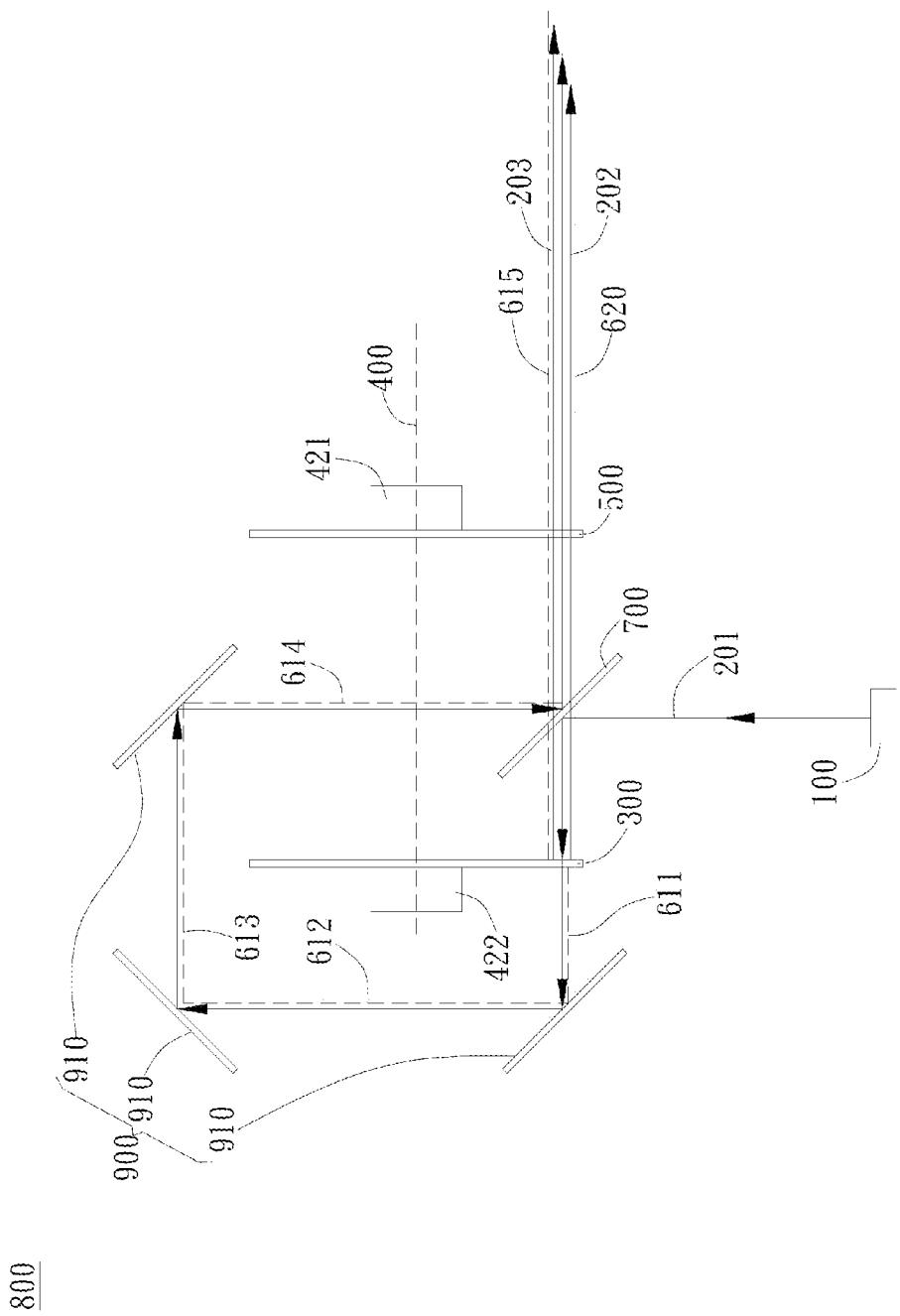
FIG. 3 is schematic view of another embodiment of the present invention having the rotating wheel and the filter wheel respectively connected with a first rotating motor and a second rotating motor.

As the different embodiment shown in FIG. 3, the rotating wheel 300 and the filter wheel 500 are respectively connected with a first rotating motor 421 and a second rotating motor 422, wherein the first rotating motor 421 and the second rotating motor rotate 422 rotate at a same rotation speed. More particularly, in this embodiment, the rotating wheel 300 and the filter wheel 500 are not connected with any shaft. Therefore, the opportunity for the shaft 410 to block the light to advance along the first light path is further reduced.

Figure 4:
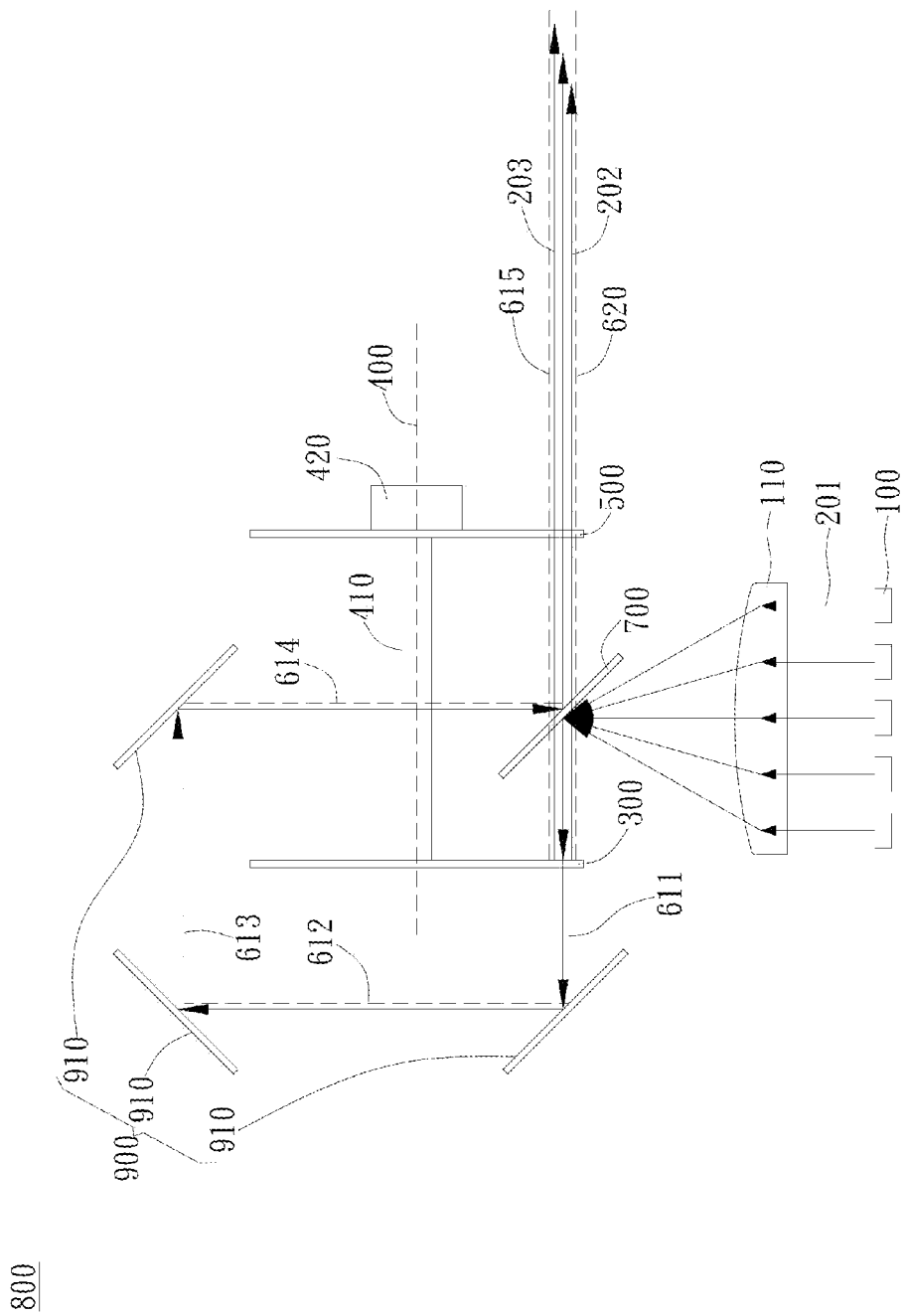
FIG. 4 is schematic view of another embodiment of the present invention further including a plurality of monochromatic light sources and a lens.

As the different embodiment shown in FIG. 4, the light source module 800 further includes a plurality of monochromatic light sources 100 and a lens 110. The plurality of monochromatic light sources 110 is disposed in an array (shown in FIG. 4) or in a line (not shown) for emitting a plurality of first color lights 201 advancing in the same direction. The lens 110 condenses the plurality of first color lights 201 to form a light beam that is guided to the dichroic mirror. As a result, the intensity of the first color light 201 guided to the dichroic mirror can be strengthened.

Figure 5:
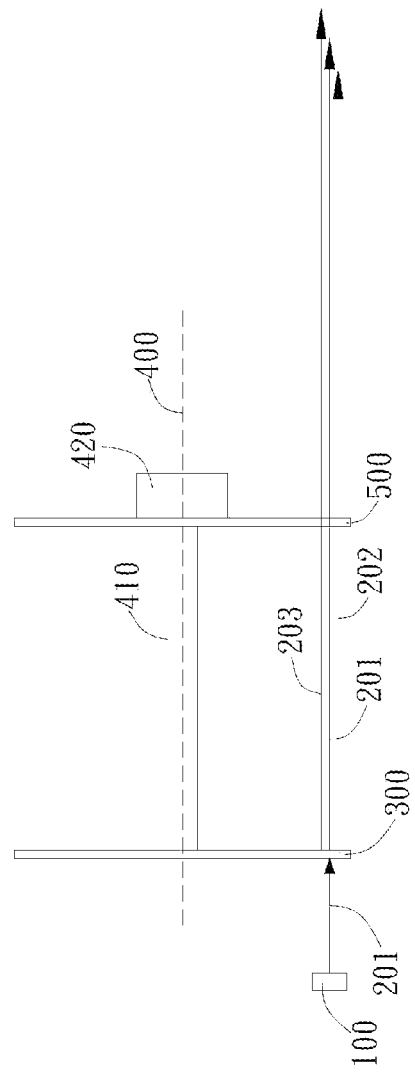
FIG. 5 is schematic view of another embodiment of the present invention without the dichroic mirror.

The light source of the present invention can exclude the dichroic mirror for further reducing the total volume. As the different embodiment shown in FIG. 5, when the first color light 201 is incident onto the light transmitting area 310 (shown in FIGS. 2A and 2B), the first color light 201 transmits through the rotating wheel 300 and the first color filter area 510 (shown in FIG. 2A). When the first color light 201 is incident onto the wavelength transforming area 320 (shown in FIG. 2A), the first color light 201 is transformed into a second color light 202 that transmits through the second color filter area 521 (shown in FIG. 2A). Moreover, the wavelength transforming area 320 further includes the first wavelength transforming area 321 (shown in FIG. 2A) and the second wavelength transforming area 322 (shown in FIG. 2A). The filter wheel 500 further includes the third color filter area 522 corresponding to the second wavelength transforming area 322. When the first color light 201 is incident onto the first wavelength transforming area 321, the first color light 201 is transformed into a second color light 202 that transmits through the second color filter area 521. When the first color light 201 is incident onto the second wavelength transforming area 322, the first color light 201 is transformed into a third color light 203 that transmits through the third color filter area 522.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A light source module, comprising:
   a monochromatic light source emitting a first color light;
   a rotating wheel having a light transmitting area and a wavelength transforming area, wherein the wavelength transforming area is coated with a first wavelength transforming material capable of transforming the first color light into a second color light;
   a filter wheel rotating at a same rotation speed with the rotating wheel, wherein the filter wheel has a first color filter area and a second color filter area respectively corresponding to the light transmitting area and the wavelength transforming area;
   a dichroic mirror disposed between the rotating wheel and the filter wheel, wherein the dichroic mirror reflects the first color light to the rotating wheel and allows the second color light to pass therethrough;
   wherein when the first color light is incident onto the light transmitting area, the first color light transmits through the rotating wheel, passes along a first light path, and transmits through the first color filter area, and wherein when the first color light is incident onto the wavelength transforming area, the first color light is transformed into the second color light that passes along a second light path and transmits through the second color filter area.

2. A light source module, comprising:
   a monochromatic light source emitting a first color light;
   a rotating wheel having a light transmitting area and a wavelength transforming area, wherein the wavelength transforming area is coated with a first wavelength transforming material capable of transforming the first color light into a second color light;

a filter wheel rotating at a same rotation speed with the rotating wheel, wherein the filter wheel has a first color filter area and a second color filter area respectively corresponding to the light transmitting area and the wavelength transforming area;

a dichroic mirror disposed between the rotating wheel and the filter wheel, wherein the dichroic mirror reflects the first color light to the rotating wheel and allows the second color light to pass therethrough;

a reflecting mirror module having a plurality of reflecting mirrors;

wherein when the first color light is incident onto the light transmitting area, the first color light transmits through the rotating wheel, passes along a first light path, and transmits through the first color filter area, and wherein when the first color light is incident onto the wavelength transforming area, the first color light is transformed into the second color light that passes along a second light path and transmits through the second color filter area;

wherein when the first color light transmits through the rotating wheel, the first color light is reflected to one surface of the dichroic mirror by the reflecting mirror module and then reflected by the other surface of the dichroic mirror to transmit through the first color filter area, wherein the second color light passes along the second light path to transmit through the dichroic mirror and then transmits through the second color filter area, wherein the part of the first light path after the first color light that has be incident onto the other surface of the dichroic mirror overlaps the part of the second light path after the second color light that has transmitted through the dichroic mirror.

3. A light source module, comprising:

a monochromatic light source emitting a first color light;

a rotating wheel having a light transmitting area and a wavelength transforming area, wherein the wavelength transforming area is coated with a first wavelength transforming material capable of transforming the first color light into a second color light, the wavelength transforming area further includes a second wavelength transforming material for transforming the first color light into a third color light;

a filter wheel rotating at a same rotation speed with the rotating wheel, wherein the filter wheel has a first color filter area and a second color filter area respectively corresponding to the light transmitting area and the wavelength transforming area, the filter wheel further includes a third color filter area corresponding to the wavelength transforming area;

a dichroic mirror disposed between the rotating wheel and the filter wheel, wherein the dichroic mirror reflects the first color light to the rotating wheel and allows the second color light to sass therethrough;

wherein when the first color light is incident onto the light transmitting area, the first color light transmits through the rotating wheel, passes along a first light path, and transmits through the first color filter area, and wherein when the first color light is incident onto the wavelength transforming area, the first color light is transformed into the second color light that passes along a second light path and transmits through the second color filter area, wherein both the second color light and the third color light pass along the second light path, and then the second color light transmits through the second color filter area and the third color light transmits through the third color filter area respectively.

4. The light source module of claim 3, wherein the first color light is a blue ray, the second color light is a green ray, the third color light is a red ray, the first color filter area of the filter wheel permits the blue ray to transmit therethrough, the second color filter area of the filter wheel permits the green ray to transmit therethrough, the third color filter area of the filter wheel permits the red ray to transmit therethrough.

5. The light source module of claim 1, wherein the rotating wheel and the filter wheel are pivotally connected with a shaft, wherein one of the rotating wheel, the shaft, and the filter wheel is connected with a rotating motor.

6. The light source module of claim 5, wherein the first light path and the shaft are located at different planes.

7. The light source module of claim 5, wherein the diameter size of the shaft is in direct proportion to the rotation speed of the rotating motor.

8. The light source module of claim 1, wherein the rotating wheel and the filter wheel are respectively connected with a first rotating motor and a second rotating motor, wherein the first rotating motor and the second rotating motor rotate at a same rotation speed.

9. The light source module of claim 1, wherein the part of the first light path detours the rotating wheel after the first color light has transmitted through the rotating wheel.

10. The light source module of claim 1, further comprising:
a plurality of monochromatic light sources disposed in an array or in a line for emitting a plurality of first color lights advancing along the same direction;
a lens for condensing the plurality of first color lights to form a light beam guided to the dichroic mirror.

11. The light source module of claim 1, wherein the light transmitting area of the rotating wheel is an opening for the first color light to transmit therethrough, wherein the wavelength transforming area is a reflective surface coated with the first wavelength transforming material.

12. The light source module of claim 1, wherein the first color filter area of the filter wheel is an opening for the first color light to transmit therethrough, wherein the second color filter area is a transparent filter material.

13. The light source module of claim 2, wherein
the wavelength transforming area further includes a second wavelength transforming material for transforming the first color light into a third color light; and
the filter wheel further includes a third color filter area corresponding to the wavelength transforming area;
wherein both the second color light and the third color light pass along the second light path, and then the second color light transmits through the second color filter area and the third color light transmits through the third color filter area respectively.

14. The light source module of claim 13, wherein the first color light is a blue ray, the second color light is a green ray, the third color light is a red ray, the first color filter area of the filter wheel permits the blue ray to transmit therethrough, the second color filter area of the filter wheel permits the green ray to transmit therethrough, the third color filter area of the filter wheel permits the red ray to transmit therethrough.

15. The light source module of claim 2, wherein the rotating wheel and the filter wheel are pivotally connected with a shaft, wherein one of the rotating wheel, the shaft, and the filter wheel is connected with a rotating motor.

16. The light source module of claim 15, wherein the first light path and the shaft are located at different planes.

17. The light source module of claim 15, wherein the diameter size of the shaft is in direct proportion to the rotation speed of the rotating motor.

18. The light source module of claim 2, wherein the rotating wheel and the filter wheel are respectively connected with a first rotating motor and a second rotating motor, wherein the first rotating motor and the second rotating motor rotate at a same rotation speed.

19. The light source module of claim 3, further comprising a reflecting mirror module having a plurality of reflecting mirrors, wherein when the first color light transmits through the rotating wheel, the first color light is reflected to one surface of the dichroic mirror by the reflecting mirror module and then reflected by the other surface of the dichroic mirror to transmit through the first color filter area, wherein the second color light passes along the second light path to transmit through the dichroic mirror and then transmits through the second color filter area, wherein the part of the first light path after the first color light that has be incident onto the other surface of the dichroic mirror overlaps the part of the second light path after the second color light that has transmitted through the dichroic mirror.

20. The light source module of claim 3, wherein the first color light is a blue ray, the second color light is a green ray, the third color light is a red ray, the first color filter area of the filter wheel permits the blue ray to transmit therethrough, the second color filter area of the filter wheel permits the green ray to transmit therethrough, the third color filter area of the filter wheel permits the red ray to transmit therethrough.

21. The light source module of claim 3, wherein the rotating wheel and the filter wheel are pivotally connected with a shaft, wherein one of the rotating wheel, the shaft, and the filter wheel is connected with a rotating motor.

22. The light source module of claim 21, wherein the first light path and the shaft are located at different planes.

23. The light source module of claim 21, wherein the diameter size of the shaft is in direct proportion to the rotation speed of the rotating motor.

24. The light source module of claim 3, wherein the rotating wheel and the filter wheel are respectively connected with a first rotating motor and a second rotating motor, wherein the first rotating motor and the second rotating motor rotate at a same rotation speed.

* * * * *